A. ECKERT.
DRINK COOLING AND DISPENSING FOUNTAIN.
APPLICATION FILED SEPT. 17, 1917.

1,398,961.

Patented Dec. 6, 1921.

2 SHEETS—SHEET 1.

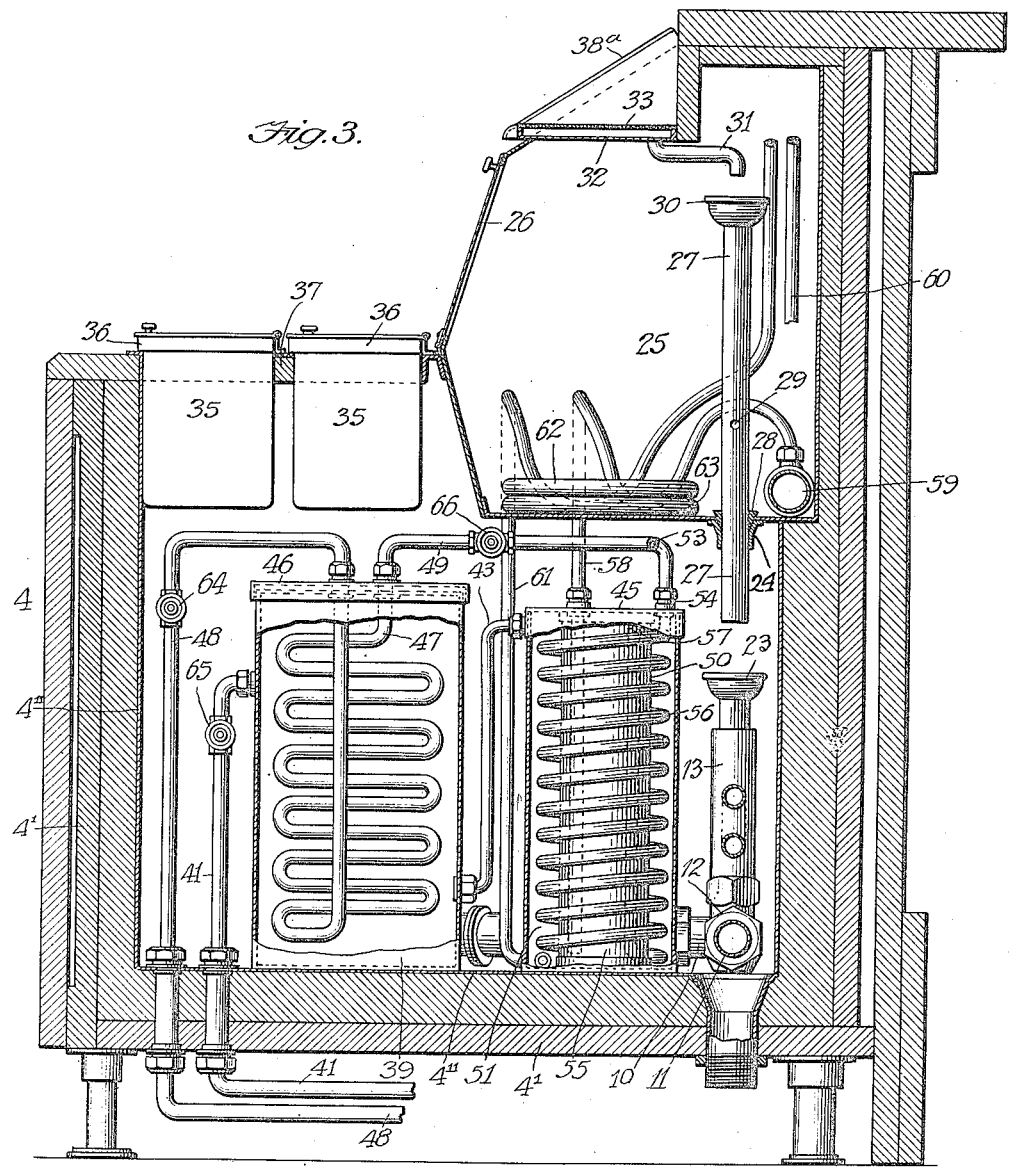

UNITED STATES PATENT OFFICE.

ADOLPH ECKERT, OF CHICAGO, ILLINOIS, ASSIGNOR TO LIQUID CARBONIC COMPANY, OF CHICAGO, ILLINOIS, A CORPORATION OF ILLINOIS.

DRINK COOLING AND DISPENSING FOUNTAIN.

1,398,961.   Specification of Letters Patent.   Patented Dec. 6, 1921.

Application filed September 17, 1917. Serial No. 191,719.

*To all whom it may concern:*

Be it known that I, ADOLPH ECKERT, a citizen of the United States, residing at Chicago, county of Cook, and State of Illinois, have invented new and useful Improvements in Drink Cooling and Dispensing Fountains, of which the following is a specification.

My fountain relates more particularly to an apparatus for cooling and dispensing so-called soft drinks, the basis or main constituent of which is ordinarily carbonated or soda water, to which is added flavoring syrup, crushed fruit, ice cream or other palatable materials, according to the order of the consumer. The fountain comprises, as usual, in constructions of the kind, cooling chambers or bins in which ice cream freezers or containers are packed in ice and salt, receptacles for crushed fruit, syrup jars, drip plate, and chipped ice compartment and a general storage compartment within which are arranged the chambers, compartments and pipes for cooling the soda or carbonated water. It is more particularly to such cooling means that my invention relates.

I have disclosed in the accompanying drawings and following specification a detailed description of the preferred form of my invention, but it is to be understood that the specific disclosure is for the purpose of exemplification only, the scope of the invention being defined in the following claims in which I have endeavored to distinguish it from the prior art so far as known to me without, however, relinquishing or abandoning any portion or feature thereof.

Figure 2:
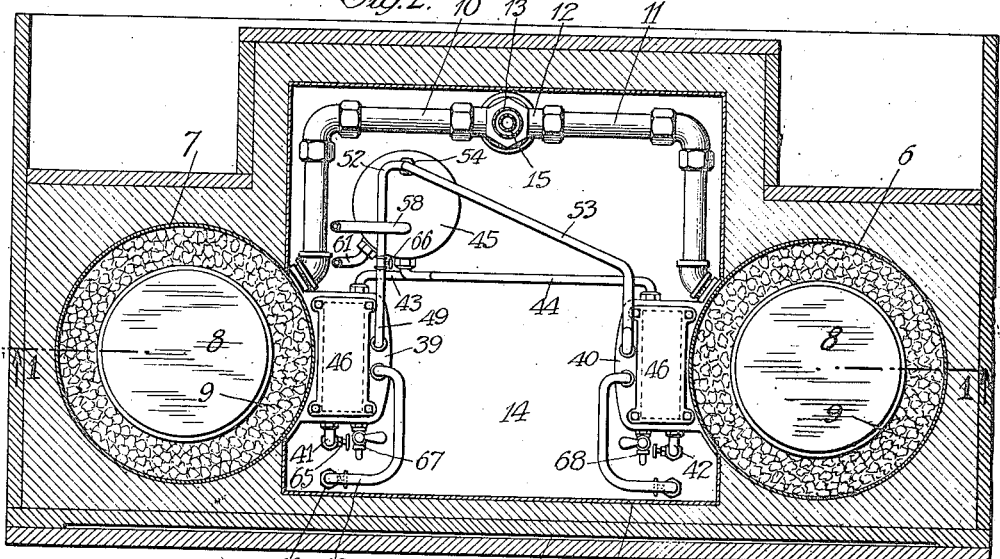
Figure 1:
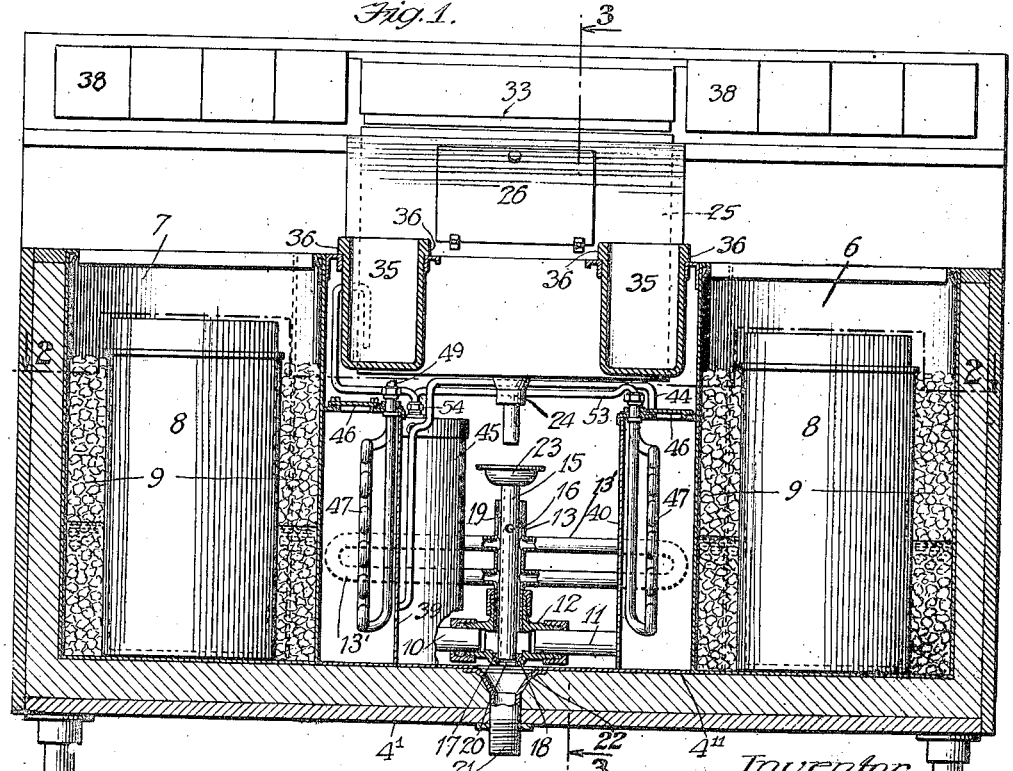

In the drawing Figure 1 is a vertical longitudinal section of my improved fountain on the plane of the line 1—1 in Fig. 2, parts being shown in elevation; Fig. 2 is a horizontal plan on the plane of the line 2—2 of Fig. 1, and Fig. 3 a vertical section on the plane of the line 3—3 of Fig. 1. Each part is identified in the several views by the same reference character.

The casing 4 of the fountain may be of any desired or approved design and is heat-insulated as usual by cork or the like interposed between the outer casing 4' and the lining 4" thereof. At opposite ends the lining, which may be of copper or the like, forms cylindrical chambers 6, 7, of a shape and size to receive cylindrical containers 8 of ice cream with a packing 9 of ice or ice and salt between said container and said lining. By making these chambers 6 and 7 cylindrical, or substantially so, the ice may be evenly packed about the ice cream container so that the latter is evenly cooled without waste of ice. The brine formed by the ice in melting in these chambers is taken care of by pipes 10, 11 leading from the respective chambers to a union 12 to which is connected a riser 13, said pipes, union and riser being located within the rectangular central or intermediate storage chamber 14 within the casing. In order to further cool the storage chamber the riser 13 is provided with the coils 13'. The height of the riser 13 depends upon the maximum level of water or brine which it is desired to maintain in the chambers 6 and 7, said riser containing an overflow pipe 15 having an overflow opening 16 therein short of the top of the riser, which overflow opening communicates with the interior of the riser. The overflow pipe or standpipe 15 is formed at its lower end with a valve 17 fitting a valve-seat 18 in said union, and said standpipe is slidable within a bearing 19 in the riser to lift the valve from its seat and permit all the water in the chambers 6, 7 to drain through the seat 18. Normally, however, the standpipe is seated so that the overflow must be taken care of by the hole 16 whereby the level of the water in the chambers 6, 7 is maintained at the height of said hole. Immediately below the valve-seat 18 is an opening 20 in the lining or wall of the central chamber and the waste pipe 21 is flared at its upper end as at 22 and is fitted to said opening and extends through the bottom of the casing. The standpipe 15 is provided with a flared opening or cup 23 which is located immediately below a drain pipe 24 which takes care of the water within the chipped ice chamber 25. The latter is preferably of metal such as copper or German silver, and provided with a door 26 by which it is normally closed. A standpipe 27 normally sits at its lower end within the flared end 28 of the waste pipe 24 and is formed with an overflow opening 29, by which the depth of the water in the chipped ice chamber is normally regulated. At its upper end the standpipe 27 is flared or provided with a cup 30 which receives the drip from a waste pipe 31 leading from pan 32 beneath the drip plate 33 for tumblers and the like.

At 35 I have shown fruit jars which are flanged at their upper ends as at 36, by which flanges the fruit jars are supported in the seats or openings formed for that purpose in the cover 37 of the central storage compartment 14 of the fountain. At opposite ends of the drip plate 33 are spaces 38 for syrup jars 38ª or the like—see Figs. 1 and 3.

As above stated my invention relates more particularly to the circulation and cooling of the water and charged water or soda. It is desirable to maintain a large supply of water and soda on hand at as uniform a temperature as practicable, a desirable temperature being approximately 40 degrees Fahrenheit. It is also essential that the water and soda be prevented from freezing notwithstanding that they be allowed to remain standing under the influence of the refrigerant, and that a reasonably low temperature be maintained in the liquids even where they are drawn off in considerable quantities in rapid succession. In my improved construction the water and soda are cooled from the ice surrounding the ice-cream containers. For this purpose I form chambers 39, 40 for receiving water within the intermediate storage space 14, utilizing the adjacent walls of the respective cylindrical chambers 6, 7 for the corresponding walls of the water chambers. Water is supplied to the respective water chambers by pipes 41, 42 leading into said chambers near the tops thereof and the water is withdrawn from said chambers by pipes 43, 44 leading therefrom to the top of the water chamber of the storage reservoir 45. A cover 46 is provided for each of the water chambers and carries a coil 47 for the circulation of charged water or soda. The ends of the coil terminate in nipples above the cover to one of which is attached the soda inlet pipe 48 and to the other the soda outlet pipe 49, such pipes being readily detachable for the purpose of removing the top to get at the interior of the chamber. The reservoir 45 is perferably cylindrical in shape and is divided into a central chamber, and an outer annular chamber by a cylindrical wall 50, the outer chamber 51 receiving and storing uncharged water from the water chambers by the pipes 43, 44, and the inner compartment 55 receiving and storing carbonated water through the pipes 52, 53, which together connect to the same nipple 54. The discharge of the carbonated water is not directly into the central compartment of the reservoir but it first flows through a coil 56 within the outer annular water compartment by which the temperature of the charged water is further reduced. The end of the coil 56 opens into the inner chamber at 57, whereby the thoroughly chilled soda water is introduced into the inner chamber. The soda water is withdrawn from the reservoir for use by a pipe 58, the inlet end of which is near the bottom of the inner compartment and which extends through the chipped ice chamber 25 and connects to a horizontal pipe 59 from which an upright pipe or pipes 60 lead to suitable faucets which may be of the usual description. The uncharged water in the outer annular compartment 51 may be drawn as required through a pipe 61 connecting to said compartment near the bottom thereof, and extending through the chipped ice compartment to a suitable faucet. Preferably each of the pipes 58 and 61 for charged and uncharged water respectively are formed with coils 62, 63 within the chipped ice chamber for further reducing the temperature of the waters on their way to the respective faucets. Suitable valves 64, 65, 66 may be provided for controlling the flow of the waters at desired points. Cocks 67, 68 are provided for draining the water chambers when desired.

Uncarbonated water entering by pipes 41, 42 flows into the water chambers 39, 40 where it is chilled by the ice in the adjacent refrigerant chamber. The extent of the common wall between the water chamber and refrigerant chamber is so proportioned to the capacity of the water chamber and its exposure to heat-absorption in the storage chamber that the water while quickly reduced to approximately the desired temperature does not freeze. From the water chamber, as the water further along in the system is drawn off, the water flows to the exterior compartment of the reservoir and thence through the coils in the chipped ice chamber where it is reduced to the ultimate temperature and is then drawn off at the spigot. The carbonated water enters the fountain through the inlet pipes 48 and circulates through the coils 47 in the water chambers, where it is reduced to substantially the temperature of the surrounding water and thence flows through the coil 56 in the outer compartment of the reservoir containing the uncharged water, where its temperature is still further reduced, and thence into the central compartment 55, thence is drawn off by the pipe 58 through its coil in the chipped ice chamber where it is given its final reduction in temperature, after which it passes to the faucet. By the above described construction I have provided means for maintaining an ample supply of water and soda and for quickly cooling additional supplies in case of an unusual draft caused by a rush of patronage.

I claim:

1. In a soda fountain, a pair of refrigerant chambers adapted to contain a refrigerating mixture, an intermediate storage chamber, portions of the walls of which are formed by the walls of the refrigerating chambers, a pair of water chambers located in the storage chamber in heat-conductive relation with the respective refrigerant chambers, a two-compartment reservoir in the intermediate chamber, connections from the respective water chambers to a compartment of said reservoir, circulating coils in the respective water chambers adapted to receive and to cool charged water, connections from said circulating coils to the other said compartment of the reservoir, and means for drawing off the charged water from said reservoir.

2. In a device of the class described, a pair of refrigerant chambers adapted to contain refrigerating material, an intermediate storage chamber, water chambers located in the storage chamber in heat-conductive relation to the respective refrigerant chambers, a reservoir in said storage chamber comprising an inner and an outer compartment, connections from said outer chamber to the respective water chambers, coils in said water chambers, a coil in the outer said compartment of the storage chamber communicating at one end with the inner compartment thereof, connections from said coil to the respective coils in the water chambers, inlet pipes leading to said water chambers and to the coils therein respectively, and connections from the inner and outer compartments of the reservoir respectively for leading off the contents thereof.

3. In a soda fountain, a pair of refrigerant chambers adapted to contain refrigerating material, a pair of water chambers in heat-conductive relation thereto, a pair of circulating coils in the respective water chambers, a storage reservoir comprising an inner and an outer compartment, connections from the outer said compartment to said water chambers, a coil in the outer said compartment, connections from said coil to the coils in the respective water chambers, a connection from the coil in the outer compartment to the inner compartment, and connections from the inner and outer compartments respectively to pipes adapted to draw off the contents thereof.

4. In a device of the class described, a storage compartment 14, a cooling coil 13' in said compartment, means for supplying cooling liquid to said coil, a drain pipe connected to said coil, a valve seat 18 between said drain pipe and said coil, a vertical pipe 15 closing at its lower end said drain pipe and having an overflow opening 16 communicating with the coil, the upper end of said pipe being open, a receptacle 25 above said chamber, a drain opening in said receptacle immediately above the stand pipe 15, a pipe closing said drain opening, an overflow opening for the receptacle 25 in said stand pipe, a drip plate 33 above said receptacle and a discharge 31 for said drip plate above the stand pipe.

ADOLPH ECKERT.